W. J. ARTIBEE.
WHEEL FOR WINDMILLS.
APPLICATION FILED SEPT. 13, 1912.

1,123,465.

Patented Jan. 5, 1915.
2 SHEETS—SHEET 1.

WITNESSES:
F. B. Townsend
Eleanor L. Nash

INVENTOR
Wilfred J. Artibee
BY
his ATTORNEY

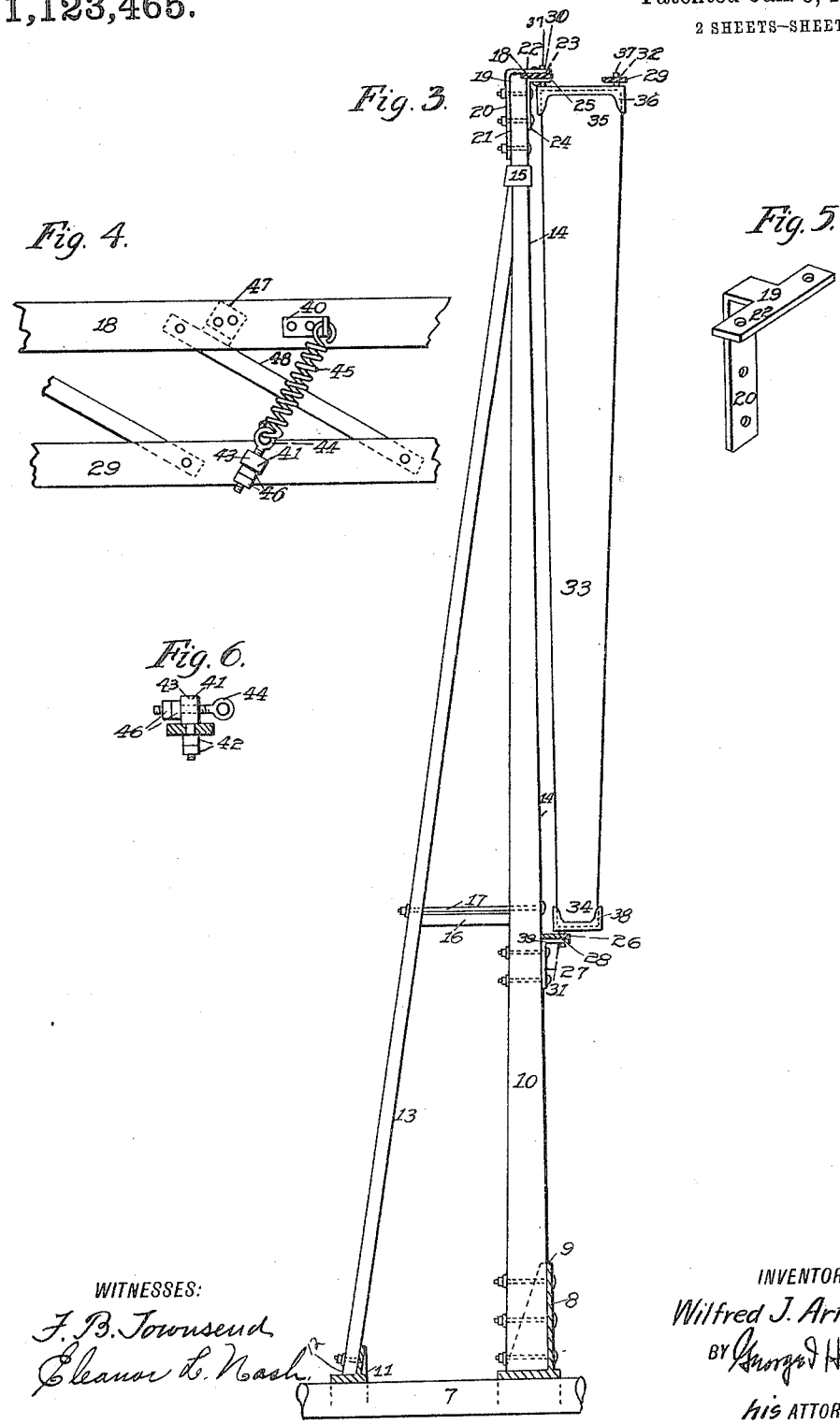
W. J. ARTIBEE.
WHEEL FOR WINDMILLS.
APPLICATION FILED SEPT. 13, 1912.
1,123,465.
Patented Jan. 5, 1915.
2 SHEETS—SHEET 2.
WITNESSES:
F. B. Townsend
Eleanor L. Nash
INVENTOR
Wilfred J. Artibee
BY
his ATTORNEY

UNITED STATES PATENT OFFICE.

WILFRED J. ARTIBEE, OF CHAZY, NEW YORK.

WHEEL FOR WINDMILLS.

1,123,465.  Specification of Letters Patent.  Patented Jan. 5, 1915.

Application filed September 13, 1912. Serial No. 720,148.

*To all whom it may concern:*

Be it known that I, WILFRED J. ARTIBEE, a citizen of the United States, residing at Chazy, in the county of Clinton, State of New York, have invented a certain new and useful Improvement in Wheels for Windmills, of which the following is a full, clear, concise, and exact description, reference being had to the accompanying drawings, forming a part of this specification.

My invention relates to improvements in wheels for windmills.

One object of my invention is to provide a wheel for a windmill capable of automatic adjustment to a predetermined maximum rate of revolution in varying wind velocities.

A further object is to provide a windmill wheel capable through automatic adjustment of maintaining a uniform speed in varying velocities of wind.

Figure 1:
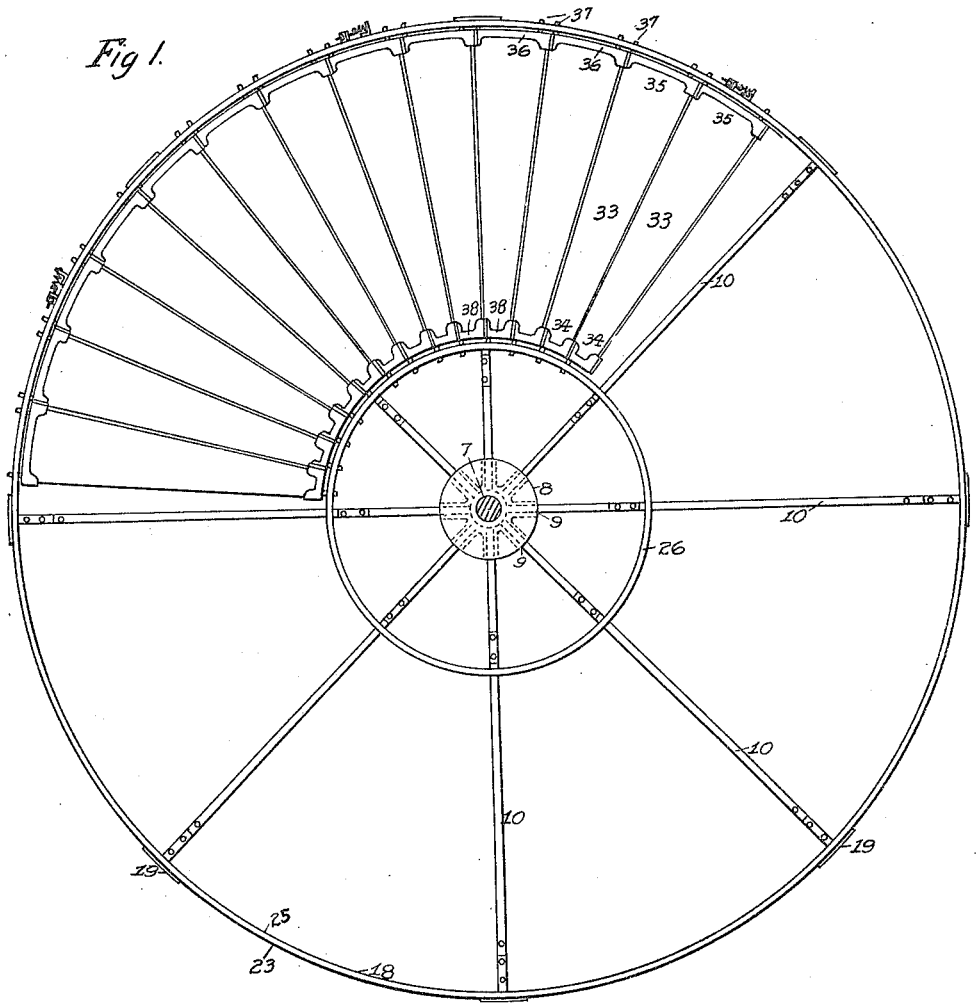
Figure 2:
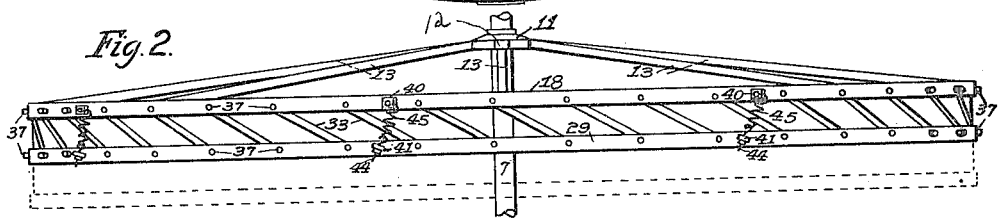

In the accompanying drawings forming a part of this specification, Figure 1 is an elevation of a wheel embodying my invention. Fig. 2 is a plan view thereof. Fig. 3 is an enlarged detail sectional view illustrating the method of attaching the blades to the wheel. Fig. 4 is an enlarged detail illustrating the method of attaching the springs to the wheel rims. Fig. 5 is a perspective view of one of the angle pieces. Fig. 6 is a detail of the adjustable eye-bolt.

Referring to the drawings, 7 designates a bearing shaft, 8 a main hub casting suitably secured thereon and provided with a plurality of radial sockets 9, 9 to secure the inner ends of an equal number of (preferably eight) spokes 10, 10. Suitably secured to the bearing shaft 7 and in front of the main hub casting 8, is the preferably smaller hub casting 11 provided with the radial sockets 12, 12 to receive the inner ends of the braces 13. Along their inner faces 14, 14, the spokes 10, 10 are perpendicular to the shaft 7. The braces 13, 13 are each suitably secured to the adjacent spoke near the outer end thereof, preferably by the band 15, and intermediate its ends is secured by the tie piece 16 which preferably is provided with the bolt 17 passing therethrough and through the adjoining spoke and brace. The large stationary circular rim 18 is secured to the outer ends of the spokes 10 by the T shaped angle piece 19 with which each spoke is provided, the upright flange 20 of the same being suitably bolted to the front face 21 of the spoke and the transverse flange 22 thereof being bolted to the outer face 23 of the large stationary rim 18. An angle piece 24 is secured to the rear face 14 of each spoke 10 at the outer end thereof and the adjacent inner face 25 of the large stationary rim 18. Within the large stationary rim and concentric therewith is the smaller stationary rim 26 attached to the rear face of each spoke by a T shaped angle piece 27, which is also secured to the inner face 28 of the said small stationary rim. Back of the large stationary rim and preferably of the same circumference therewith is the movable rim 29. The three rims hereinbefore mentioned are each provided with perforations 30, 30 in the large stationary rim, 31, 31 in the small stationary rim, and 32, 32 in the movable rim. All said perforations are substantially radial to the shaft 7. Each perforation 30 of the large stationary rim is in radial alinement with a corresponding perforation 31 in the small stationary rim. The perforations in each rim are co-incident in number with the preferably flat blades 33, 33. The blades may be of any suitable number and each of them is pivoted at the inner end 34, to the small stationary rim 26 and at the outer end 35 to the large stationary rim and the movable rim. To make this pivotal connection I inclose the outer end of each blade with a socket casting 36, having at either end thereof an outwardly projecting pin or lug 37, one of the pins or lugs being received within a perforation 30 of the large stationary rim and the other within a perforation 32 of the movable rim. The inner end of each blade is inclosed in a socket casting 38 having an inwardly projecting pin or lug 39 which is received within a perforation 31 of the small stationary rim. It will be apparent that all the blades will stand at the same angle and that the pivotal movement of each will be duplicated by the others. At suitable intervals along the outer circumference of the large stationary rim 18 are secured the lugs 40 and at smaller intervals along the circumference of the movable rim 29 the bolts 41. The bolts 41 are each provided at the inner surface of the movable rim with the nuts 42, 42 and at the outer surface thereof with the perforated head 43. Passing transversely through the head 43 is the eye-bolt 44 to which is secured one end of the spring 45, the other end of said spring being secured to the lug 40.

The tension of the spring may be adjusted by means of the nuts 46, 46 with which the eye-bolt 44 is provided. To limit the forward movement of the movable rim 29, the inner circumference of the large stationary rim 18 is provided with the stops 47 which each engage the adjacent forward face 48 of one of the blades 33 when the blades are in normal position, as illustrated in Fig. 4 of the drawings. By placing the springs 45 under a given tension, the rate of revolution of the wheel in the normal position of the blades under a given maximum wind velocity may be predetermined. I prefer to adjust this tension to a point at which the normal position of the blades in relation to the rims will remain undisturbed in a wind velocity up to eight miles per hour. As the wind velocity increases upon this fixed velocity, the springs 45 will yield to the increased pressure of the wind upon the forward faces of the blades, automatically changing the angle thereof to the direction of the wind. As the wind velocity decreases toward the fixed point of pressure, the springs will return the blades toward their normal position. Thus, by suitable adjustment of the spring tension within fixed wide limits of wind velocity, a predetermined uniform rate of wheel revolution may be maintained.

I claim:—

In a device of the character described, a wheel, blades pivoted thereto, a movable rim pivotally connected to said blades, springs fastened between the wheel and the movable rim, stop members on said wheel to limit the movement of the blades under pressure of the springs.

WILFRED J. ARTIBEE.

Witnesses:
GEORGE W. ROUCHETTI,
W. GREENE.

Copies of this patent may be obtained for five cents each, by addressing the "Commissioner of Patents, Washington, D. C."